United States Patent [19]

Tomoyuki

[11] 4,072,363
[45] Feb. 7, 1978

[54] INERTIA-CONTROLLED VALVE FOR VEHICLE BRAKING SYSTEMS

[75] Inventor: Nogami Tomoyuki, Toyota, Japan

[73] Assignee: Toyota Jidosha Kogyo Kabushiki Kaisha, Toyota, Japan

[21] Appl. No.: 766,532

[22] Filed: Feb. 7, 1977

[30] Foreign Application Priority Data

Aug. 10, 1976 Japan .................................. 51-95063

[51] Int. Cl.$^2$ .............................................. B60T 8/14
[52] U.S. Cl. ..................................................... 303/24 C
[58] Field of Search .................... 303/6 C, 6 R, 24 A, 303/24 C, 24 F, ; 188/349

[56] References Cited

U.S. PATENT DOCUMENTS 3,384,423  5/1968  Cumming ............................ 303/24 C
3,994,533  11/1976  Ohta ..................................... 303/6 C Primary Examiner—Duane A. Reger
Attorney, Agent, or Firm—Kenyon & Kenyon

[57] ABSTRACT

A braking fluid pressure control device comprises a housing fixedly mounted at an inclined angle on a vehicle body frame, a differential piston reciprocable within a stepped bore of the housing and an inertia-controlled valve assembly housed in a fluid chamber in parallel with the stepped bore. In this control device, inlet and outlet ports are arranged in relation to the stepped bore to facilitate air purge from the interior of the device and a bypass passage is further provided within the housing to permit fluid flow from the upper portion of the fluid chamber toward the outlet port when brake fluid is supplied into the device.

5 Claims, 6 Drawing Figures

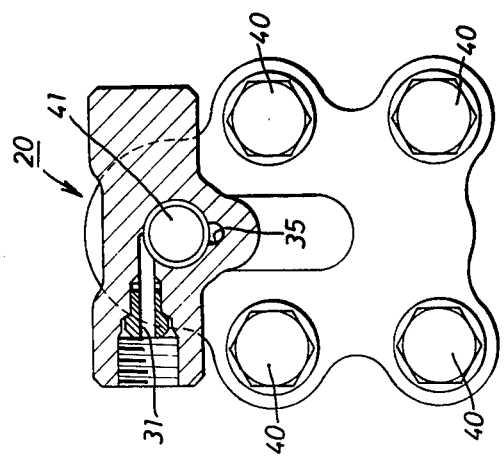
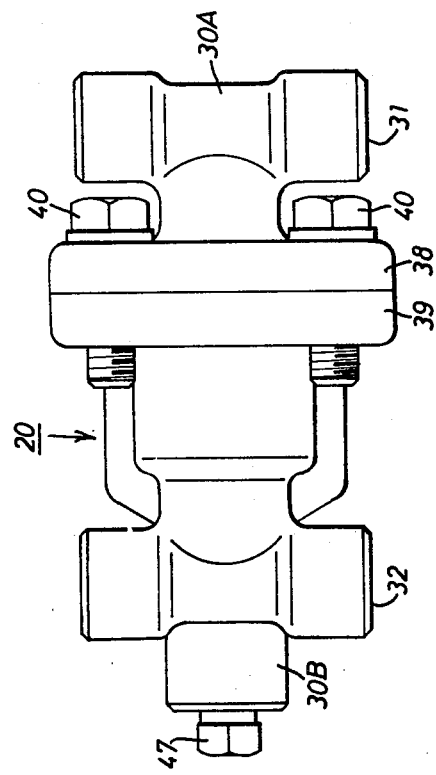
Fig. 4
Fig. 5

INERTIA-CONTROLLED VALVE FOR VEHICLE BRAKING SYSTEMS

BACKGROUND OF THE INVENTION

The present invention relates to fluid pressure control devices for vehicle braking systems, and more particularly to a improvement of a fluid pressure control device of the type which comprises a housing provided thereon with an inlet port for connection to a master cylinder and an outlet port for connection to wheel brake cylinders and provided therein with a stepped bore in communication with the inlet and outlet ports respectively at the small and large diameter portions thereof and a first fluid chamber provided in parallel with the stepped bore and in communication with the small and large diameter portions of the stepped bore, a differential piston slidably disposed within the stepped bore to provide second and third fluid chambers respectively in open communication with the inlet and outlet ports, a spring loading the piston axially in a direction toward the outlet port, and a cut-off valve assembly including a valve seat provided on the side wall of the first chamber to permit fluid flow between the second and third fluid chambers and an inertia-controlled ball housed within the first chamber to co-operate with the valve seat and rolling toward the valve seat to cut-off fluid flow from the second chamber to the third chamber when the ball is subjected to a deceleration in excess of a predetermined value.

In the conventional fluid pressure control device of this kind, the stepped bore for the differential piston and the first fluid chamber for the cut-off valve assembly are arranged in parallel within the housing to minimize the whole size of the control device. In use of such a control device, the parallel arrangement of the stepped bore and the first fluid chamber causes the air to remain within the second and third fluid chambers which are formed at both sides of the stepped bore. The air also remains in the upper portion of the first fluid chamber since the inertia-controlled ball is housed in the first fluid chamber and the communication between the first and third fluid chambers is conducted through the valve seat. The air remained within the fluid chambers gets into the braking fluid applied to the wheel brake cylinders to harm the braking effects.

SUMMARY OF THE INVENTION

Accordingly, the primary object of the present invention is directed to avoid the above-noted drawbacks and to provide an improved fluid pressure control device wherein the inlet and outlet ports are located in relative to the stepped bore to facilitate air-purge from the interior of the control device.

Another object of the present invention is to provide an improved fluid pressure control device, having the above-mentioned characteristics, wherein the inlet and outlet ports are arranged on the housing to facilitate piping works of the braking system.

According to the present invention, in the fluid pressure control device having the above-mentioned construction, the inlet and outlet ports are arranged to be located at the upper portion of the housing when mounted on the vehicle body frame and directly connected to the small and large diameter portions of the stepped bore respectively, a bypass passage is provided to permit fluid flow from the upper portion of the first fluid chamber toward the outlet port and a fluid blocking means is disposed within the bypass passage to normally close the bypass passage, the fluid blocking means being adjusted to open the bypass passage only when brake fluid is supplied into the vehicle braking system.

BRIEF DESCRIPTION OF THE DRAWINGS

The above and other objects, features and attendant advantages of the present invention will be more fully appreciated as the same becomes better understood from the following detailed description of the preferred embodiment when considered in connection with the accompanying drawing in which:

FIG. 4 is a partially sectional view taken along the line 4 — 4 in FIG. 3;

FIG. 5 is a plan view of the control device; and

DESCRIPTION OF THE PREFERRED EMBODIMENT

Figure 1:
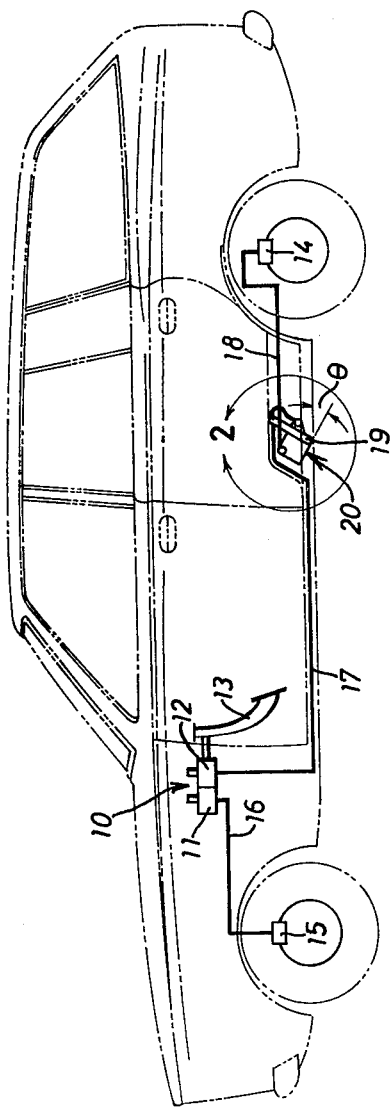
FIG. 1 is a schematic diagram of a vehicle braking system, showing the installation arrangement of a fluid pressure control device in accordance with the present invention.
Figure 2:
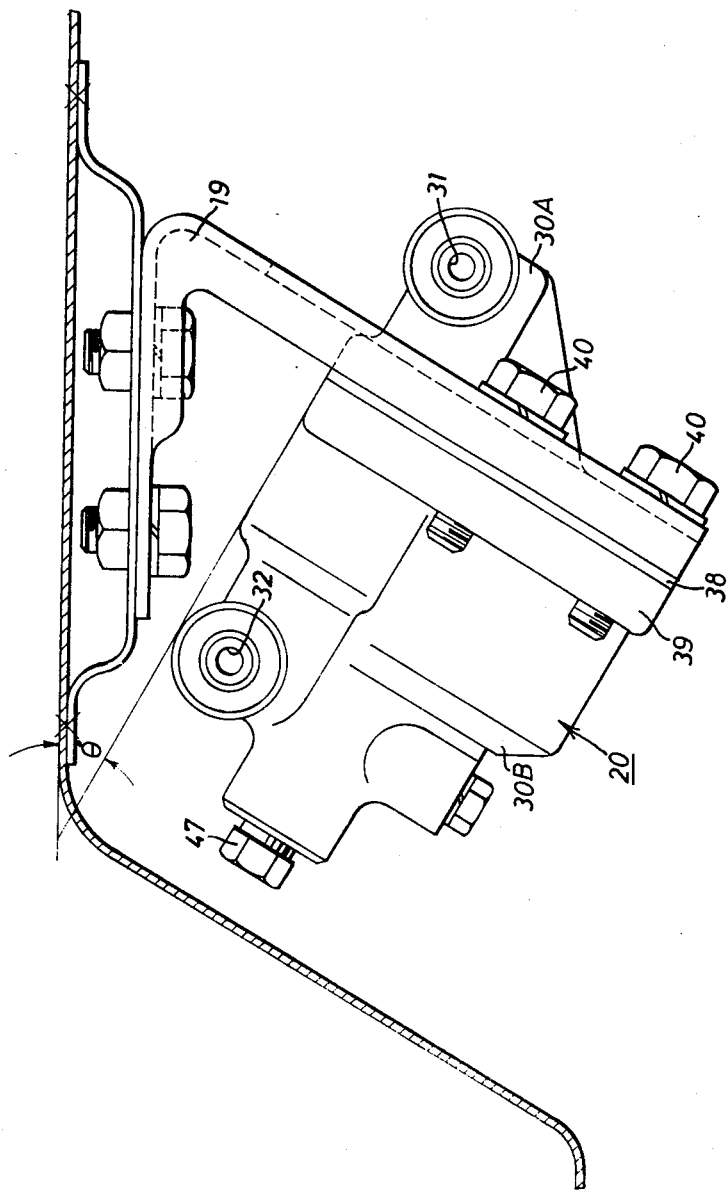
FIG. 2 is an enlarged side view of an encircled portion indicated by a reference numeral 2 in FIG. 1.

Referring now to the drawings, particularly in FIG. 1 there is illustrated a conventional tandem master cylinder 10 which is operated by depression of a foot brake pedal 13. The master cylinder 10 is provided with a front pressure chamber 11 connected to front wheel brake cylinders 15 by way of a pipe-line 16 and a rear pressure chamber 12 connected to rear wheel brake cylinders 14 by way of pipelines 17 and 18. Interposed between the pipe-lines 17 and 18 is a fluid pressure control device 20 in accordance with the present invention. The control device 20 is fixedly mounted under the vehicle body floor by way of a bracket 19 at an inclined angle 0 as best shown in FIG. 2.

Figure 3:
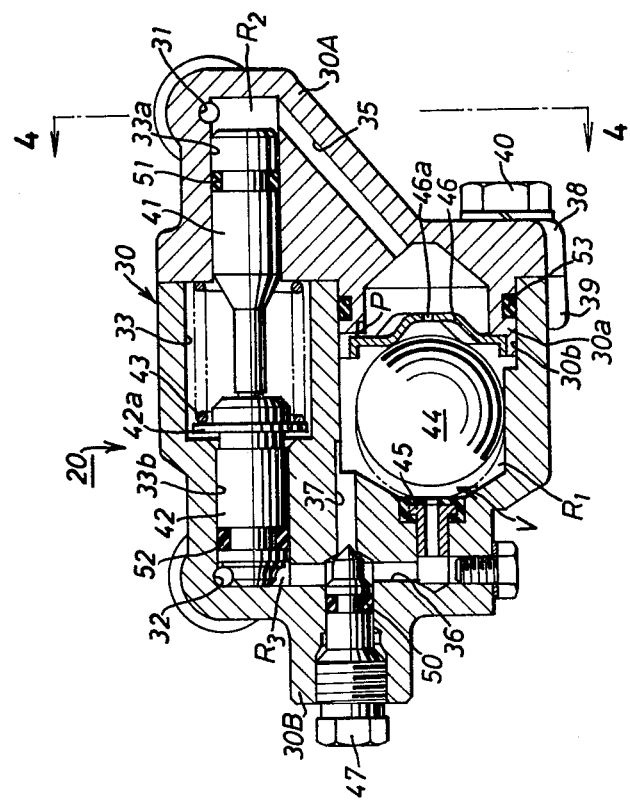
FIG. 3 illustrates a view in longitudinal section of the control device.

As best illustrated in FIG. 3, the control device 20 comprises a housing assembly 30 which is provided therein with a small diameter piston 41, a large diameter piston 42 and an inertia-controlled ball 44. The housing assembly 30 includes a rear housing 30A provided thereon with an inlet port 31 and a front housing 30B provided thereon with an outlet port 32. The inlet port 31 is connected to the rear pressure chamber 12 of the master cylinder 10 by way of the pipe-line 17. The outlet port 32 is connected to the rear wheel brake cylinders 14 by way of the pipe-line 18. Within the housing assembly 30, there are provided in parallel a stepped cylindrical bore 33 and a first fluid chamber $R_1$. The stepped cylindrical bore 33 includes a small diameter portion 33a to which the inlet port 31 opens and a large diameter portion 33b to which the outlet port 32 opens. The first fluid chamber $R_1$ is communicated with the small and large diameter portions 33a and 33b of the stepped bore 33 respectively by way of a first passage 35 and a second passage 36. The second passage 36 is also connected to the upper portion of the first fluid chamber $R_1$ through a bypass passage 37, which is normally closed by the tip of a screw plug 47 threaded into the front housing 30B through an annular seal member 50. In supplying brake fluid into the braking system, the plug 47 is released outwardly to open the communication between the first fluid chamber $R_1$ and the second passage 36.

The small diameter piston 41 is reciprocably engaged within the small diameter portion 33a of the stepped bore 33 through an annular seal member 51 to form a second fluid chamber $R_2$ to which the inlet port 31 opens directly and the first fluid chamber $R_1$ is connected by way of the first passage 35. The large diameter piston 42 is reciprocably engaged within the large diameter portion 33b of the stepped bore 33 through an annular seal member 52 to form a third fluid chamber $R_3$ to which the outlet port 32 opens directly and the first fluid chamber $R_1$ is connected by way of the second passage 36. A compression coil spring 43 is interposed between an inner end wall of the rear housing 30A and annular flange 42a of the large diameter piston 42. Thus, in this assembling the large diameter piston 42 is normally biased toward the third fluid chamber $R_3$ and engaged with the inner end wall of the large diameter portion 33b of the stepped bore 33.

The inertia-controlled ball 44 housed within the first fluid chamber $R_1$ is free to roll forwardly up the inclined bottom of the first chamber $R_1$ and co-operates with an annular valve seat 45 secured on the side wall of the chamber $R_1$ to provide a cut-off valve V. The ball 44 normally rests under gravity in the position shown in the drawing and is received by a support plate 46 which is secured to the inner wall of the rear housing 30A and provided thereon with an orifice 46a. In braking operation, when the rate of deceleration caused by the application of the brakes exceeds a predetermined value the ball 44 will roll forwardly by the inertia force acting thereon toward the valve seat 45 so that the cut-off valve V is closed to interrupt fluid communication between the first and third fluid chambers $R_1$ and $R_3$.

The above-mentioned embodiment according to the present invention is characterized in 1. means for air-purge from the interior of the control device 20,
2. the relative positions of the inlet and outlet ports 31 and 32, and
3. sealing means between the rear and front housing 30A and 30B.

These constructional features are detailed hereinafter.

1. Means for air-purge from the interior of the control device 20

The inlet port 31 opens tangentially at the upper wall of the small diameter portion 33a of the stepped bore 33, as well shown in FIG. 4. Meanwhile, the outlet port 32 also opens tangentially at the upper wall of the large diameter portion 33b of the stepped bore 33. The communication between the first fluid chamber $R_1$ and the second passage 36 is conducted by outwardly retraction of the screw plug 47 in the bypass passage 37. A communication hole P is also provided between the upper portion of the support plate 46 and the rear housing 30A.

2. The relative positions of the inlet and outlet ports 31 and 32

As well seen in FIGS. 4 and 5, the inlet port 31 is drilled through the left hand boss of a pair of lateral bosses integrally formed on the upper portion of the rear housing 30A in consideration of easy piping works in respect to shapes of the vehicle floor. As well seen in FIG. 5, the outlet port 32 is also drilled through the left hand boss of a pair of lateral bosses integrally formed on the upper portion of the front housing 30B in consideration of easy piping works in respect to shapes of the vehicle floor.

3. Sealing means between the rear and front housing 30A and 30B

The rear housing 30A has at its inner end face an annular protrusion 30a which is fluid-tightly coupled through an annular seal member 53 in a bore 30b drilled at the inner end face of the front housing 30B. As well seen in FIG. 5, the rear and front housings 30A and 30B are respectively provided with flanges 38 and 39 along the outer circumferences of the jointing portions. Thus, the rear housing 30A is firmly assembled to the front housing 30B by fastening bolts 40 threaded into the flanges 38 and 39. Due to this assembling construction, even if a space is produced between the engagement faces of the rear and front housing 30A and 30B by hydraulic internal pressure exerted within the control device 20, the sealing effect is maintained between the rear and front housing 30A and 30B.

When the control device 20 is mounted under the vehicle floor, as shown in FIG. 2, the inlet and outlet ports 31 and 32 are arranged such that the pipe-lines 17 and 18 are located along the bottom surface of the vehicle floor to prevent the pipe-lines 17 and 18 from being damaged by such hard substances as stones and the like on the roads. In supplying brake fluid into the braking system with the control device 20, prior to supply of brake fluid the screw plug 47 is turned back to open the communication between the upper portion of the first fluid chamber $R_1$ and the second passage 36 by way of the bypass passage 37 and also bleeder plugs (not shown) provided on the rear wheel brake cylinders 14 are released. Under this condition, when the master cylinder 10 is operated by repeated depression of the brake pedal 13, brake fluid supplied into the rear pressure chamber 12 of the master cylinder 10 is delivered into the second chamber $R_2$ of the control device 20 through the pipe-line 17 and the inlet port 31. The supplied fluid then flows into the first chamber $R_1$ through the first passage 35, the orifice 46a and the hole P. The brake fluid in the first chamber $R_1$ then reaches the third chamber $R_3$ through the valve seat 45 and the bypass passage 37 and flows into the rear wheel brake cylinders 14 through the outlet port 32 and the pipe-line 18 to be finally drained out from the bleeder plugs. In this instance, occasionally the inertia-controlled ball 44 seats on the valve seat 45 by pressure of the brake fluid passing through the orifice 46a. In such a case, the fluid runs through the bypass passage 37 and the passage 36.

In the fluid delivery process as mentioned above, due to the tangential positioning of the inlet port 31 to the upper wall of the small diameter portion 33a, the fluid makes swirling movements within the second chamber $R_2$ so that the fluid proceeds to the first passage 35 accompanying therein the air existing within the second chamber $R_2$. The air with the fluid flows into the first chamber $R_1$ through the first passage 35. The air then passes through the hole P due to its self-buoyancy and the running force of the fluid. Subsequently, the air gets together with the air remained in the upper portion of the first chamber $R_1$ and flows into the third chamber $R_3$ through the bypass passage 37 and the second passage 36. The air then passes together with the fluid through the outlet port 32 and the pipe-line 18 to reach the rear wheel brake cylinders 14 to be finally drained out with the fluid from the bleeder plugs. After the air-purging process is completed within the hydraulic circuit for the rear wheel brake cylinders 14, the bleeder plugs are closed as well as the screw plug 47 to close the bypass passage 37 so as to effect braking features as described hereinafter.

Under the unloaded condition of the vehicle, depression of the brake pedal 13 produces fluid pressure within the respective pressure chambers 11 and 12 of the master cylinder 10. The pressure in the front pressure chamber 11 is directly applied to the front wheel brake cylinders 15 through the pipe-line 16, whereas the pressure in the rear pressure chamber 12 is applied to the inlet port 31 of the control device 20 through the pipe-line 17. The master cylinder pressure Pm applied to the inlet port 31 is applied to the third chamber $R_3$ by way of the second chamber $R_2$, the first passage 35, the first chamber $R_1$, the valve seat 45 and the second passage 36 in sequence and, then, applied to the rear wheel brake cylinders 14 through the outlet port 32 and the pipe-line 18 to operate the rear wheel brakes. Thus, the vehicle is braked in accordance with the value of the master cylinder pressure applied to the front and rear wheel brake cylinders 15 and 14.

Figure 6:
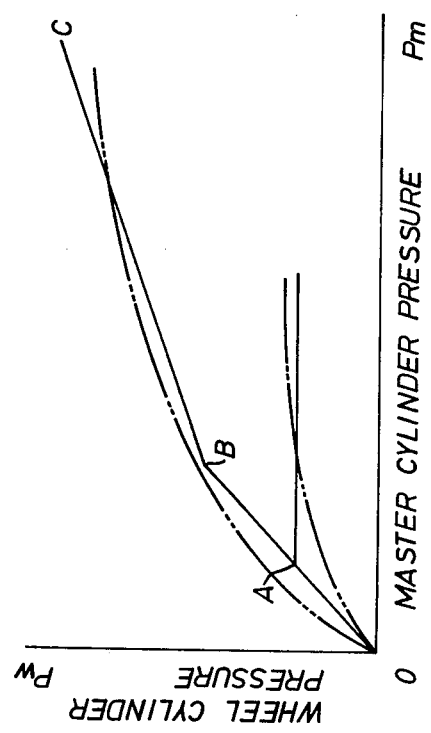
FIG. 6 is a graph indicating the pressure controlling characteristics of the control device.

In this braking operation, within the control device 20, the small diameter piston 41 is urged forwardly by the pressure in the second chamber $R_2$ and the large diameter piston 42 is urged rearwardly by the pressure in the third chamber $R_3$. In this instance, the rightward movement of the piston 42 is restricted by the resilient force of the coil spring 43. When the rate of deceleration caused by the application of the brakes exceeds a predetermined value, the ball 44 rolls forwardly toward the valve seat 45 by the inertia force acting thereon so that the cut-off valve V is closed to interrupt the fluid communication between the first chamber $R_1$ and the second passage 36, which is indicated by a character A in FIG. 6. In this stage, even when the master cylinder pressure Pm increases, the small and large diameter pistons 41 and 42 don't move forwardly and the pressure Pw in the third fluid chamber $R_3$ or the rear wheel brake cylinder does not increase. And the ball 44 is held on the valve seat 45 by the inertia moment and the difference in pressure between the first and third fluid chambers $R_1$ and $R_3$.

Under the loaded condition of the vehicle, when the brake pedal 13 is depressed to apply the master cylinder pressure from the master cylinder to the front and rear wheel brake cylinders 15 and 14 in the same process as described above, the large diameter piston 42 moves toward the rearward stroke end thereof by the pressure in the third chamber $R_3$ against the resilient force of the coil spring 43. In this braking operation, when the inertia force acting on the ball 44 exceeds a predetermined value, the ball 44 rolls forwardly up the bottom surface of the first chamber $R_1$ to close the cut-off valve V so that the fluid communication between the first and third chambers $R_1$ and $R_3$ is blocked, which is indicated by a character B in FIG. 6. If the master cylinder pressure Pm is increased by continued depression of the brake pedal, the pressure acting on the small diameter piston 41 moves the large diameter piston 42 toward the outlet port 32. The large piston 42 acts on the fluid trapped in the pipe-line 18 to the rear wheel brake cylinders 14 by the closing of the cut-off valve V and increases the pressure in the pipe-line 18, but owing to the difference between the effective pressure receiving areas of the pistons 41 and 42 the rate of increase is less than the rate of increase in the master cylinder pressure Pm, as shown by a segment line between characters B and C in FIG. 6. Thus, the desired accuracy in pressure adjusting operation is always well maintained by the control device 20 regardless of the variations in static load on the wheels of the vehicle.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. In a fluid pressure control device for a vehicle braking system incorporating between a master cylinder and a wheel brake cylinder, which comprises a housing adapted to be fixedly mounted at an inclined angle on a vehicle body frame, said housing being provided thereon with an inlet port for connection to said master cylinder and an outlet port for connection to said wheel brake cylinder and being provided therein with a stepped bore in communication with said inlet and outlet ports respectively at the small and large diameter portions thereof and a first fluid chamber provided in parallel with said stepped bore and in communication with the small and large diameter portions of said stepped bore at both sides thereof; a differential piston slidably disposed within said stepped bore to provide second and third fluid chambers respectively in open communication with said inlet and outlet ports, the smaller end of said piston being exposed in said second chamber and the larger end in said third chamber; a spring loading said piston axially in a direction toward said outlet port; and a cut-off valve including a valve seat provided on the side wall of said first chamber to permit fluid flow between said second and third fluid chambers and an inertia-controlled ball housed within said first chamber to co-operate with said valve seat and rolling toward said valve seat on the inclined bottom surface of said first chamber to cut-off fluid flow from said second chamber to said third chamber when said ball is subjected to a deceleration in excess of a predetermined value;

the improvement wherein said inlet and outlet ports are arranged to be located at the upper portion of said housing when mounted on the vehicle body frame and directly connected to the small and large diameter portions of said stepped bore respectively and wherein a bypass passage is provided to permit fluid flow from the upper portion of said first fluid chamber toward said outlet port and a fluid blocking means is disposed within said bypass passage to normally close said bypass passage, said fluid blocking means being adjusted to open said bypass passage only when brake fluid is supplied into said vehicle braking system.

2. A fluid pressure control device as claimed in claim 1, wherein said fluid blocking means is a screw plug adjustably threaded into said housing to normally close said bypass passage, said screw plug being released to open said bypass passage only when brake fluid is supplied into said vehicle braking system.

3. A fluid pressure control device as claimed in claim 1, wherein said inlet port is opened tangentially at the upper wall of the small diameter portion of said stepped bore.

4. A fluid pressure control device as claimed in claim 1, wherein said housing is provided with two pair of lateral bosses at the upper portion thereof and wherein said inlet and outlet ports are respectively provided on each one of said bosses to be opened tangentially at the upper wall of the small and large diameter portions of said stepped bore.

5. A fluid pressure control device as claimed in claim 1, wherein said housing comprises first and second housings jointed to each other, said first housing having an annular protrusion fluid-tightly coupled within said second housing.

* * * * *

UNITED STATES PATENT AND TRADEMARK OFFICE
CERTIFICATE OF CORRECTION

PATENT NO. : 4,072,363
DATED : February 7, 1978
INVENTOR(S) : Tomoyuki Nogami

It is certified that error appears in the above-identified patent and that said Letters Patent are hereby corrected as shown below:

Correct inventor's name from "Nogami Tomoyuki" to

--Tomoyuki Nogami--

Col. 1, line 8, change "a" first occurrence to --an--

Col. 2, line 41, change "O" to --θ--

Col. 3, line 16, before "annular" insert --an--

Col. 3, line 53, change "outwardly" to --outward--

UNITED STATES PATENT AND TRADEMARK OFFICE
CERTIFICATE OF CORRECTION

PATENT NO. : 4,072,363

DATED : February 7, 1978

INVENTOR(S) : Tomoyuki Nogami

It is certified that error appears in the above-identified patent and that said Letters Patent are hereby corrected as shown below:

Col. 4, line 16, change "housing" to --housings--

Col. 4, line 19, change "housing" to --housings--

Col. 4, line 49, after "the" second occurrence insert --second--

Signed and Sealed this

Thirteenth Day of June 1978

[SEAL]

Attest:

RUTH C. MASON
Attesting Officer

DONALD W. BANNER
Commissioner of Patents and Trademarks